(12) United States Patent
Aronstam

(10) Patent No.: US 6,795,373 B1
(45) Date of Patent: Sep. 21, 2004

(54) PERMANENT DOWNHOLE RESONANT SOURCE

(75) Inventor: Peter S. Aronstam, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 0 days.

(21) Appl. No.: 10/366,841

(22) Filed: Feb. 14, 2003

(51) Int. Cl.[7] ................................................ G01V 1/30
(52) U.S. Cl. .................... 367/85; 367/83; 367/911; 181/104; 181/106; 175/50
(58) Field of Search ............... 367/83–85, 911; 175/50; 181/104, 106; 166/249, 254

(56) References Cited

U.S. PATENT DOCUMENTS

| | | | | |
|---|---|---|---|---|
| 3,380,551 A | * | 4/1968 | Lang ........................... | 367/911 |
| 4,671,379 A | * | 6/1987 | Kennedy et al. ............ | 181/106 |
| 4,834,210 A | * | 5/1989 | Kennedy .................... | 181/106 |
| 4,993,001 A | | 2/1991 | Winbow et al. ............ | 367/144 |
| 5,268,537 A | * | 12/1993 | Winbow et al. ............ | 181/106 |
| 5,406,530 A | * | 4/1995 | Yamamoto .................. | 367/57 |
| 5,886,255 A | * | 3/1999 | Aronstam ................ | 73/152.01 |
| 5,886,303 A | * | 3/1999 | Rodney ...................... | 181/102 |
| 6,094,401 A | * | 7/2000 | Masak et al. ................. | 367/84 |
| 6,172,614 B1 | * | 1/2001 | Robison et al. ............ | 340/85.3 |
| 6,388,577 B1 | * | 5/2002 | Carstensen ............... | 340/854.3 |
| 6,456,566 B1 | * | 9/2002 | Aronstam ................... | 367/86 |
| 6,626,253 B2 | * | 9/2003 | Hahn et al. .................. | 175/48 |

FOREIGN PATENT DOCUMENTS

| | | | |
|---|---|---|---|
| FR | 2703457 | * | 10/1994 |
| GB | 2276723 | * | 5/1994 |

* cited by examiner

*Primary Examiner*—Nelson Moskowitz
(74) *Attorney, Agent, or Firm*—Madan, Mossman & Sriram, P.C.

(57) ABSTRACT

A wellbore system and method for producing seismic waves in an earth formation. The system comprises a cavity containing fluid. The cavity is in a space between a wellbore tubular, which may be casing or production tubing, and the wellbore formation. A device is provided for generating pressure waves in the cavity at resonance frequencies of the cavity. The pressure waves generate seismic waves that radiate into the adjacent earth formation that may be recorded. The recorded seismic waves may be used to determine parameters of interest of the earth formation.

65 Claims, 14 Drawing Sheets

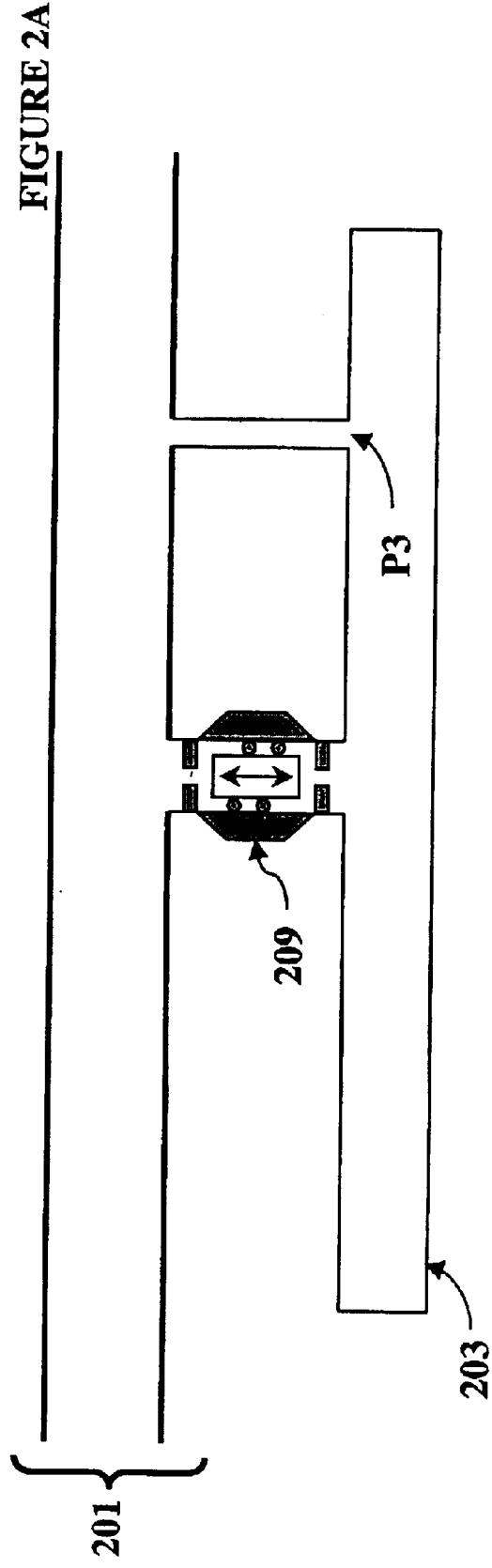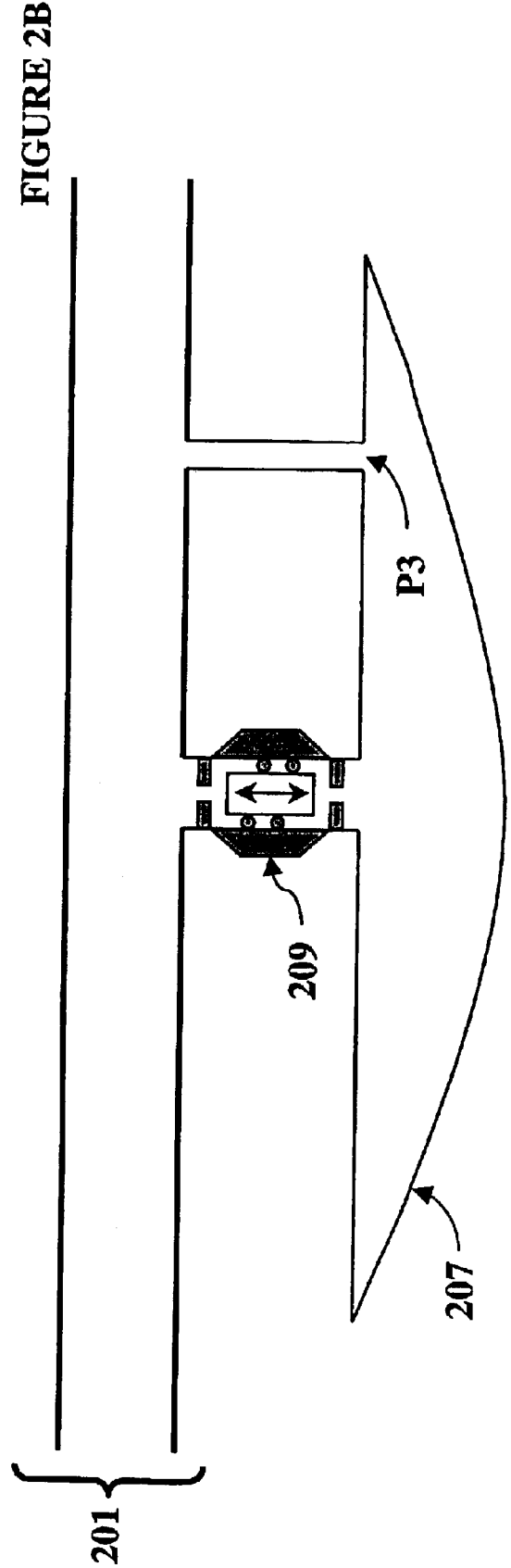

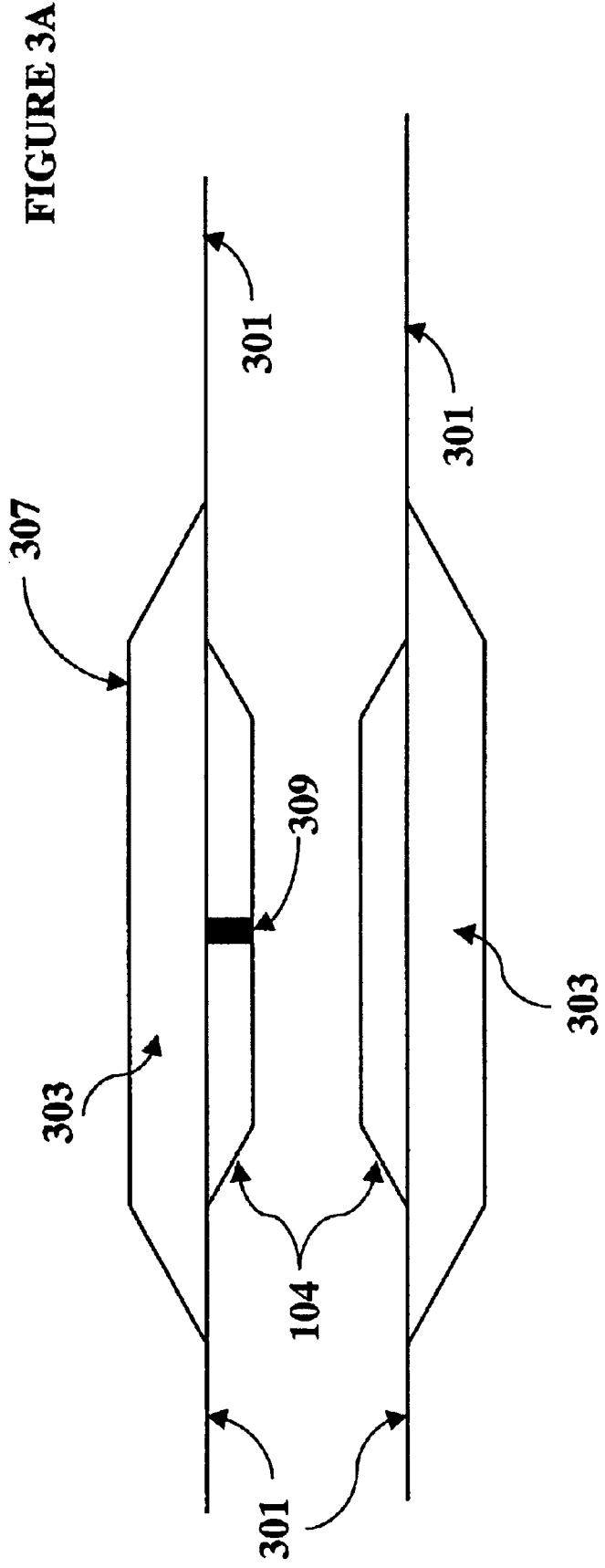

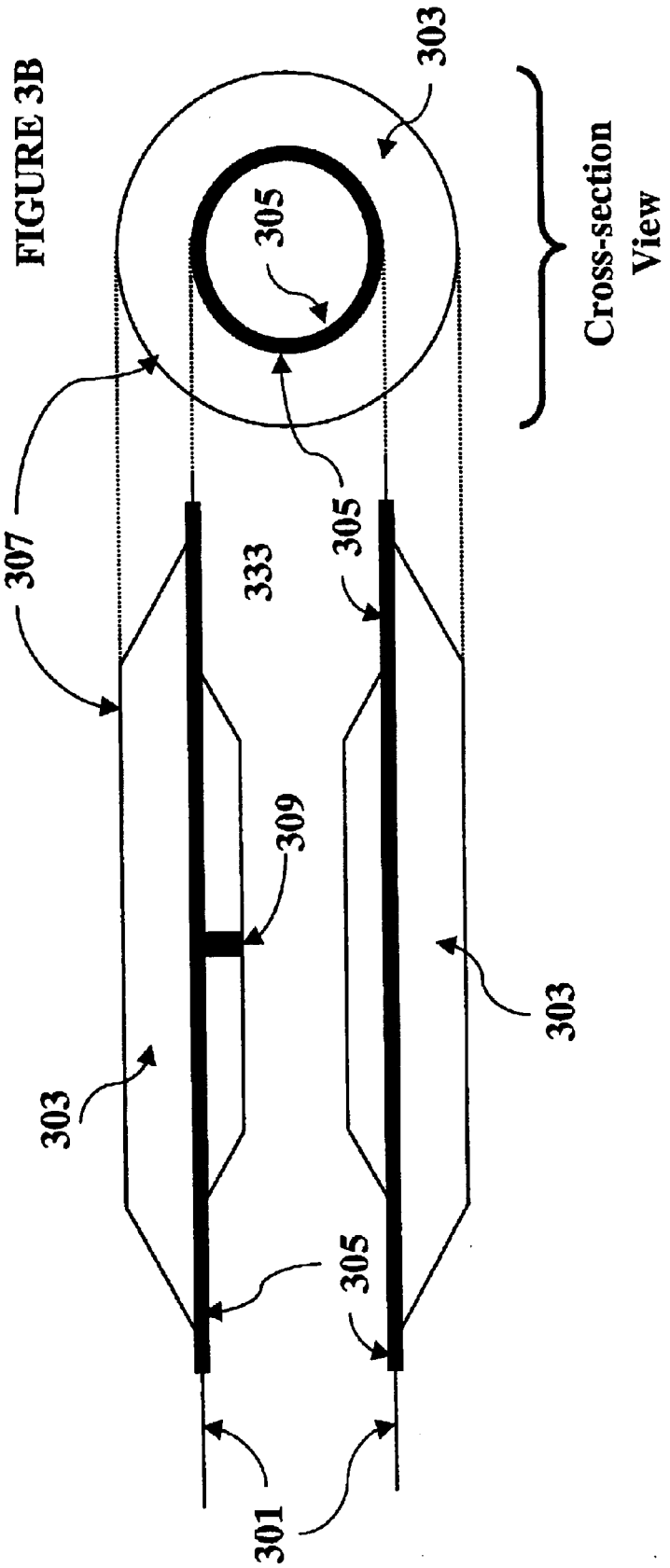

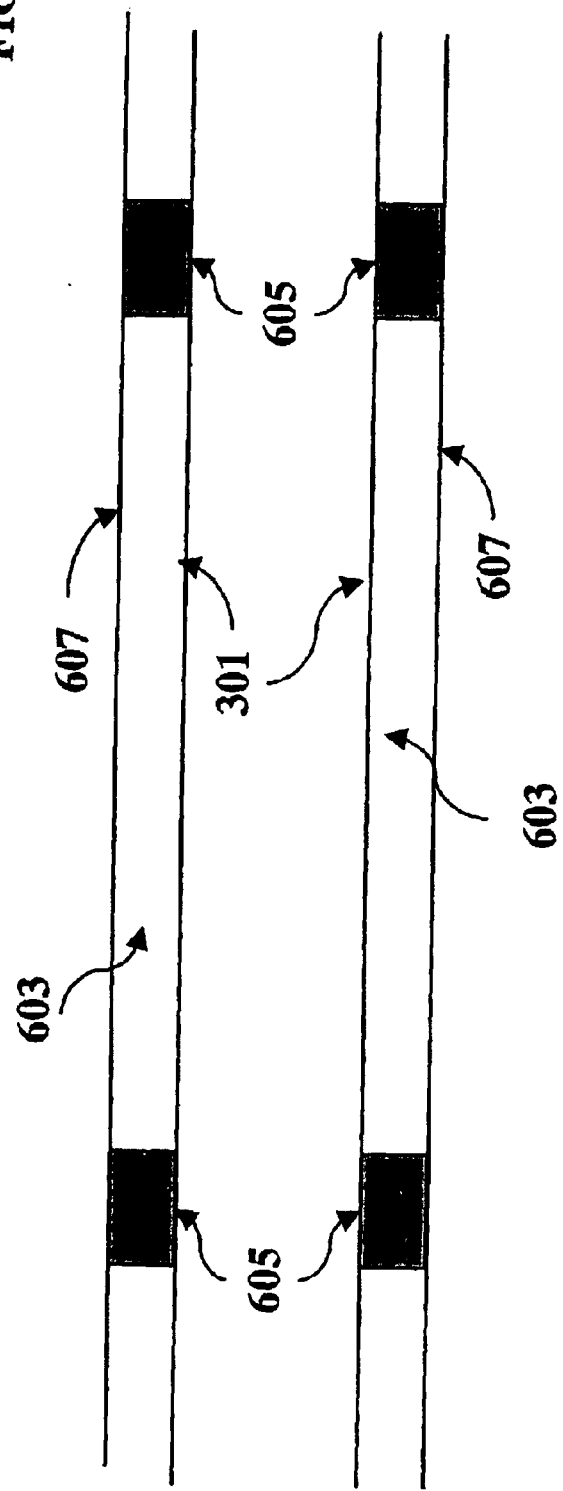

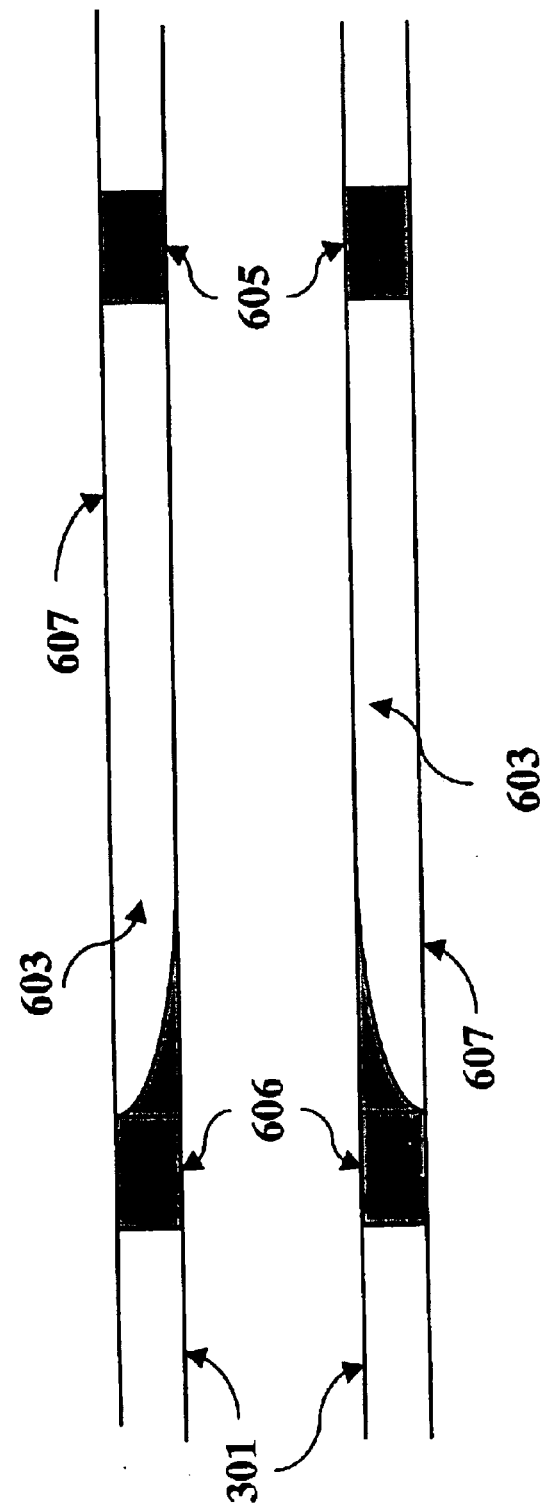

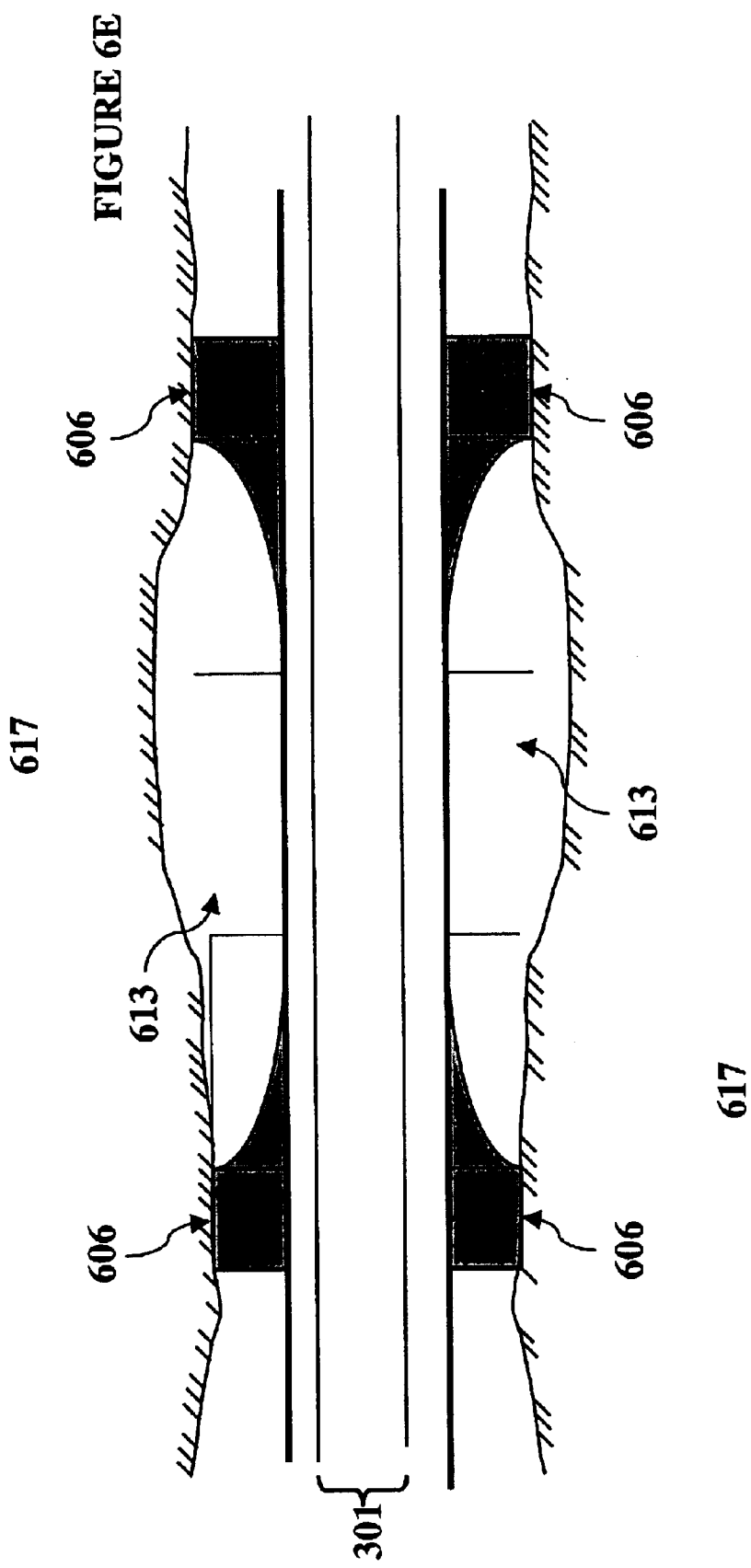

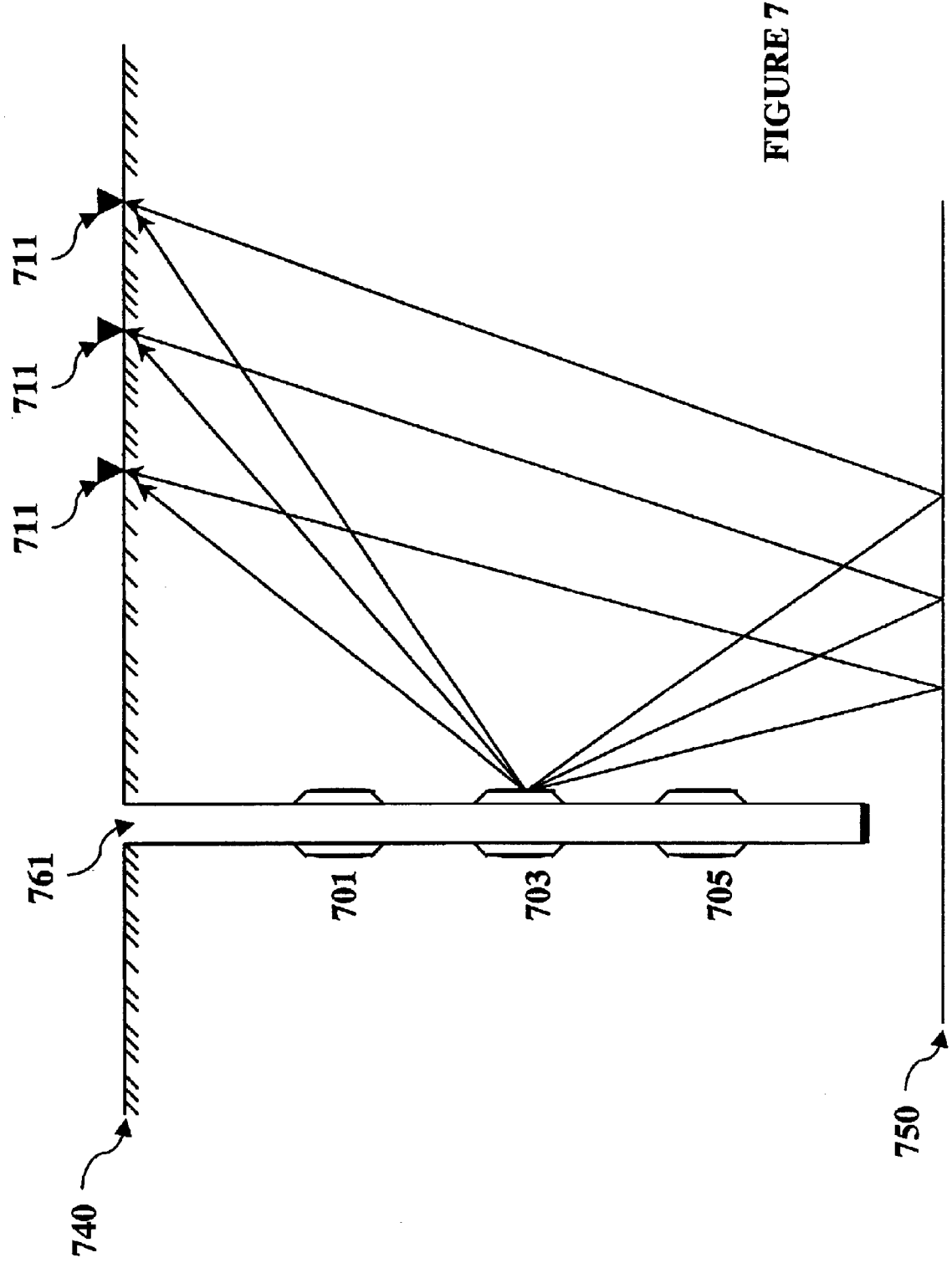

PERMANENT DOWNHOLE RESONANT SOURCE

FIELD OF THE INVENTION

The invention relates to the downhole generation of seismic waves for use in investigation and monitoring of earth formation reservoir characteristics surrounding a well borehole. In particular, the invention relates to a method and system for monitoring seismic energy radiated from well boreholes into surrounding earth formations. The seismic body waves radiated into the surrounding earth formation, which are generated within well bore structures, are used for cross well type projects and reverse vertical seismic profile (RVSP) type projects to investigate and monitor hydrocarbon or other mineral deposits over the productive lifetime of a producing reservoir.

This is a system for monitoring the distribution of the contents of a subsurface mineral deposit over its economic life span for long-term resource management. The system employs pressure waves generated within well bore structures, which are radiated as seismic waves into surrounding earth formation. Time varying changes of selected attributes of those seismic waves that have transmitted the deposit between boreholes or between boreholes and seismic sensors, may be indicative of the temporal changes in the mineral content.

BACKGROUND OF THE INVENTION

In the oil and gas industry, geophysical prospecting techniques are commonly used to aid in the search for and evaluation of subterranean hydrocarbon deposits. Generally, a seismic energy source is used to generate a seismic signal which propagates into the earth and is at least partially reflected by subsurface seismic reflectors (i.e., interfaces between underground formations having different acoustic impedances). The reflections are recorded by seismic detectors located at or near the surface of the earth, in a body of water, or at known depths in boreholes, and the resulting seismic data may be processed to yield information relating to the location of the subsurface reflectors and the physical properties of the subsurface formations.

Geophysical surveys are used to discover earth structure, mineral deposits, and the subsurface extent of mineral deposits such as oil, natural gas, water, sulphur, etc. Geophysical methods may also be used to monitor changes in the deposit, such as depletion resulting from production of the mineral over the economic lifetime of the deposit. The usefulness of a geophysical study depends on the ability to quantitatively measure and evaluate some geophysical analogue of petrophysical parameters related to the presence of the mineral under consideration.

Seismic methods may be applied to production-management monitoring as well as to exploration of hydrocarbon reservoirs. As is well known to geophysicists, an acoustic seismic source at or near the surface of the earth is caused periodically to radiate a seismic wavefield into the earth at each of a plurality of source survey stations. Acoustic seismic sources are usually of the impulsive or swept-frequency type. An impulsive source produces a very sharp minimum-phase wave of very short duration and that somewhat simulates the generation of an impulse. An explosion is an example of such a source.

The swept-frequency or chirp type seismic source may generate a controlled wavetrain to form a relatively long pilot signal such as 2 to 30 seconds to assure sufficient energy is imparted to the earth. The swept-frequency or chirp type source method relies on signal compression to compress the signal and ensure sufficient vertical resolution to resolve the position of subsurface reflectors. Signal compression generally is called deconvolution, with many techniques well known in the art of seismic data processing. Deconvolution of sweep or chirp signals compresses the source signal into a much shorter signal representative of a subsurface reflective boundary. The accuracy and effectiveness of any deconvolution technique is directly related to how well the source signal is known or understood. Most deconvolution operators are derived from statistical estimates of the actual source waveform.

Swept frequency type sources emit energy in the form of a sweep of regularly increasing (upsweep) or decreasing (downsweep) frequency in the seismic frequency range. In addition to upsweeps and downsweeps, various alternative forms of swept frequency signals are well known in the art, for example, so called random sweeps, pseudo-random sweeps or nonlinear sweeps. In a nonlinear sweep, more time may be spent sweeping high frequencies than low frequencies to compensate for high-frequency attenuation in the signal's travel through the earth, or to shape to a desired wavelet. The vibrations are controlled by a control signal, which can control the frequency and phase of the seismic signals.

The acoustic seismic wavefield radiates in all directions to insonify the subsurface earth formations. The radiated wavefield energy is reflected back to be detected by seismic sensors (receivers) located at designated stations also usually located at or near the surface of the earth, but which may also be in the subsurface, for example, in well boreholes (herein, also called wellbores). The seismic sensors convert the mechanical earth motions, due to the reflected wavefield, to electrical signals. The resulting electrical signals are transmitted over a signal-transmission link of any desired type, to instrumentation, usually digital, where the seismic data signals are archivally stored for later processing.

The travel-time lapse between the emission of a wavefield by a source and the reception of the resulting sequence of reflected wavefields by a receiver is a measure of the depths of the respective earth formations from which the wavefield was reflected. The relative amplitudes of the reflected wavefields may be a function (an analogue) of the density and porosity of the respective earth formations from which the wavefields were reflected as well as the formations through which the wavefields propagated. The phase angle and frequency content of returned signals in the reflected wavefields may be influenced by formation fluids, the sought-for minerals or other formation characteristics.

The processed seismic data associated with a single receiver are customarily presented as a one-dimensional time scale recording displaying rock layer reflection amplitudes as a function of two-way wavefield travel time. A plurality of seismic traces from a plurality of receivers sequentially distributed along a line of survey at intervals, such as 25 meters, may be formatted side by side to form a two dimensional (2-D) analog model of a cross section of the earth. Seismic sections from a plurality of intersecting lines of survey distributed over an area of interest provide three-dimensional (3-D) imaging. A series of 3-D surveys of the same region made at successive time intervals, such as every six months, would constitute a 4-D, time-lapse study of the subsurface that would be useful to monitor, for example, the fluid-depletion rate of hydrocarbon reservoir.

From the above considerations, it is reasonable to expect that time-lapse seismic monitoring, that is, the act of monitoring the time-varying characteristics of seismic data associated with a mineral deposit such as a hydrocarbon reservoir of oil or gas over a long period of time, would allow monitoring the depletion of the fluid or mineral content, or the mapping of time-varying attributes such as the advance of a thermal front in a steam-flooding operation.

Successful time-lapse monitoring requires that differences among the processed data sets must be attributable to physical changes in the petrophysical characteristics of the deposit. This criterion is severe because changes in the data-acquisition equipment and changes in the processing algorithms, inevitable over many years may introduce differences among the separate, individual data sets from surveys that are due to instrumentation, not the result of dynamic reservoir changes.

In particular, using conventional surface exploration techniques, long-term environmental changes in field conditions such as weather and culture may affect the outcome. If time-lapse tomography or seismic monitoring is to be useful for quantitative hydrocarbon reservoir monitoring, instrumentation and environmental influences that are not due to changes in reservoir characteristics must be transparent to the before and after seismic data sets. Successful time-lapse tomography requires careful preliminary planning.

One way to avoid many time-dependent environmental changes and updated state-of-the-art instrumental changes is to permanently install seismic sources and seismic detectors in one or more boreholes in and around the area of economic interest. Identical processing methods are applied to the data throughout the monitoring period using multiple cross-well (cross-borehole) tomography rather than conventional surface type field seismic operations. One such method is disclosed in U.S. Pat. No. 5,886,255 to Aronstam, filed Oct. 14, 1997 and assigned to the assignee of this invention and which is incorporated herein by reference as a teaching of multiple cross-well tomography.

Another description of wellbores containing permanent downhole formation evaluation systems can be found in U.S. Pat. No. 6,456,566 to Aronstam, filed Jul. 21, 2000 and assigned to the assignee of this invention and all of the contents of which are incorporated herein by reference. The '566 patent teaches the use of minor borehole obstructions as sources of seismic energy.

U.S. Pat. No. 5,406,530, issued Apr. 11, 1995 to Tokuo Yamamoto, teaches a non-destructive method of measuring physical characteristics of sediments to obtain a cross sectional distribution of porosity and permeability values and variations and of shear modulus and shear strength. A pair of boreholes has borehole entries spaced apart from each other at a predetermined distance and a plurality of hydrophones is spaced at predetermined known locations. A pseudo random binary sequence code generator as a source of seismic energy is place in another borehole and activated to transmit pseudo-random wave energy from the source to the hydrophones. Seismic wave characteristics are measured in a multiplicity of paths emanating from the source to the hydrophones using cross-well tomography.

The Yamamoto teaching is primarily directed to use in shallow boreholes for engineering studies. Such holes are less than 100 meters deep, as opposed to oil-field boreholes, which may be two to five kilometers deep. The requirement for an active source to be placed at various levels in the borehole is problematic because the source can damage the hole and interfere with production. Since the seismic equipment must be moved up and down the boreholes, it is impossible to maintain identical recording conditions over an extended time period.

G. W. Winbow in U.S. Pat. No. 4,993,001 issued Feb. 12, 1991, describes a method and apparatus for converting tube waves into downhole body waves for seismic exploration. The equipment comprises a rotary-valve tube wave source for producing swept-frequency tube waves that are injected into tubing or well bore fluid. The tube waves are converted into body waves by an elongate tube wave converter located at a selected position downhole. The tube wave converter comprises an elongate body that preferably substantially fills the well bore or tubing and has a preferred shape in order to convert efficiently the tube waves to body waves at the selected position downhole. This patent is directed primarily to reverse vertical seismic profiling (RVSP). Winbow acknowledges that it is well known in the art that "nonuniformities in the borehole" cause seismic-wave mode conversions that cause secondary seismic radiation and associated multiples.

Winbow employs a single tube-wave converter to serve as a single source of direct and reflected seismic waves but he must repeatedly reposition the device at spaced-apart intervals down the length of the borehole to get extended vertical coverage as in cross-well tomography. That system thus is difficult to implement for the fixed permanent instrumental installation required for 4-D seismic monitoring operation. A further disadvantage of this scheme is that very high energy tube waves are required, which in turn leads to forming strong background noises as the tube waves enter the borehole and when they impact the end of the borehole.

Another downhole device related to that described in U.S. Pat. No. 4,993,001 is a broadband resonant wave downhole seismic source disclosed by Winbow et al. in U.S. Pat. No. 5,268,537. The device is used to partially or completely block off the borehole and create a fluid-filled borehole cavity. The fluid inside the cavity is oscillated to establish a standing pressure wave which is radiated through the wellbore into the surrounding formation. However, this device functions most effectively at high frequencies (i.e., greater than about 1,500 Hz). It is well known that lower frequencies (less than about 1000 Hz) are preferable for routine reflection seismic and tomographic imaging work.

U.S. Pat. No. 4,671,379, which issued to Kennedy et al. on Jun. 9, 1987 and U.S. Pat. No. 4,834,210, which issued to Kennedy on May 30, 1989, discloses a system in which a pulsed energy source is deployed between two end members. Wellbore fluid occupies the space between the two end members, and the pulsed energy source excites the fluid into oscillation within the borehole space between the two end members. The distance between the two end members is varied as the frequency of the pulsed energy source is varied in order to maintain the system at resonance.

In the Kennedy patents, energy is supplied downhole from the surface through coil tubing connected to a rotary valve located on the device downhole. A column of fluid in the wellbore is excited by the supplied energy to produce a resonant standing wave. This is accomplished by isolating the fluid between two gas bladders to form a column of fluid and exciting the fluid in the column into an oscillating motion with a driver that is in communication with the column of fluid. The fluid is oscillated at the resonant frequency of the column defined by the two gas bladders. During the operation of the invention, it is desirable to sweep the rotary valve through a range of resonant frequencies in order to gain more information about the subsurface of the earth. In order for this invention to perform a frequency sweep and maintain the resonant frequency of the fluid in the column, the length of the column must change for the various frequencies in the sweep. The device accomplishes this task by physically moving the gas bladders during the sweep. In order to maintain the column at ½ wave resonance, the gas bladders are moved during an approximately 45 second sweep through a total distance of about 100 feet. The device must maintain resonance in order to operate effectively.

The source is strong and does not cause borehole damage. The patent states that the device provides a relatively efficient source of energy by operating at the resonant frequency of the column of fluid. However, several problems arise from this approach. First, mechanical movement downhole is necessary because the source must operate at the resonant frequency of the column and cannot vary the resonant frequency without changing the column length. The device must contain relatively complicated downhole equipment in order to vary the length of the column. A system requiring downhole moving parts such as this one is less reliable than desired. Repairs can only be affected by removing the system from the borehole leading to costly down time in operations. A second problem is with the duration of the sweep time of the device. As a sweep is made the length of the column varies. The distance each bladder must travel during a sweep is approximately 50 feet (based on a half wave length of a resonant standing pressure wave). Therefore, the sweep requires an extended time, approximately 45 seconds. It is not possible with this system to produce short sweeps of a few seconds each. Nor is it possible to operate with an impulsive source as the exciter.

The Kennedy et al. patents also describe an alternate embodiment that does not vary the length of the column. In this embodiment, inflatable sleeves surround the conduit between the end elements. These sleeves may be inflated with air causing a change in the apparent compressibility in the borehole fluid. The change in fluid properties changes the resonant frequency of the cavity. However, in this case also, the system can only execute relatively long sweeps and requires downhole moving parts leading to lower field reliability.

There is a need for a system of seismic sources fixed permanently in boreholes that may be used for monitoring time-varying reservoir attributes such as the distribution of the contents of a mineral deposit. Preferably this system would not interfere with or interrupt production of economic resources. Additionally, there is a need for a system that not only would be used with intentionally generated seismic energy, but could also take advantage of naturally occurring or ambient energy in boreholes, for example fluid flow energy, that may be converted to seismic body waves radiated into earth formations around boreholes.

SUMMARY OF THE INVENTION

The present invention is a method of generating seismic body waves in a hydrocarbon reservoir within an earth formation. Signals indicative of a parameter of interest of hydrocarbon reservoirs are detected using a plurality of seismic detectors. Seismic body waves radiate from at least one resonant cavity in a borehole and traverse earth formations. The signals traversing the earth formations and hydrocarbon reservoirs are detected to provide signals indicative of a parameter of interest at more than one time. These signals are used to determine a change in the hydrocarbon reservoir by comparing signals indicative of a parameter of interest of the hydrocarbon reservoir with signals indicative of a parameter of interest of the hydrocarbon reservoir detected at the later time.

BRIEF DESCRIPTION OF THE DRAWINGS

The novel features which are believed to be characteristic of the invention, both as to organization and methods of operation, together with the objects and advantages thereof, will be better understood from the following detailed description and the drawings wherein the invention is illustrated by way of example for the purpose of illustration and description only and are not intended as a definition of the limits of the invention:

FIG. 2A illustrates an electro-solenoid driven source for an acoustic resonator.

FIG. 2B illustrates an acoustic resonator, the resonant cavity of FIG. 2A with a cavity designed for broad frequency resonance emanation.

FIG. 3A illustrates an acoustic resonator placed in a well bore outside of production tubing.

FIG. 3B illustrates an insulated resonant cavity and its crossection placed in a well bore.

FIG. 6A illustrates a resonant cavity formed by dual packers.

FIG. 6C illustrates a resonant cavity formed by a combination of dual packers.

FIG. 6E illustrates a resonant cavity formed where specialty-shaped packers are external to the casing and the formation FIG. 7 is a schematic of a Reverse VSP type project utilizing the invention.

Figure 1:
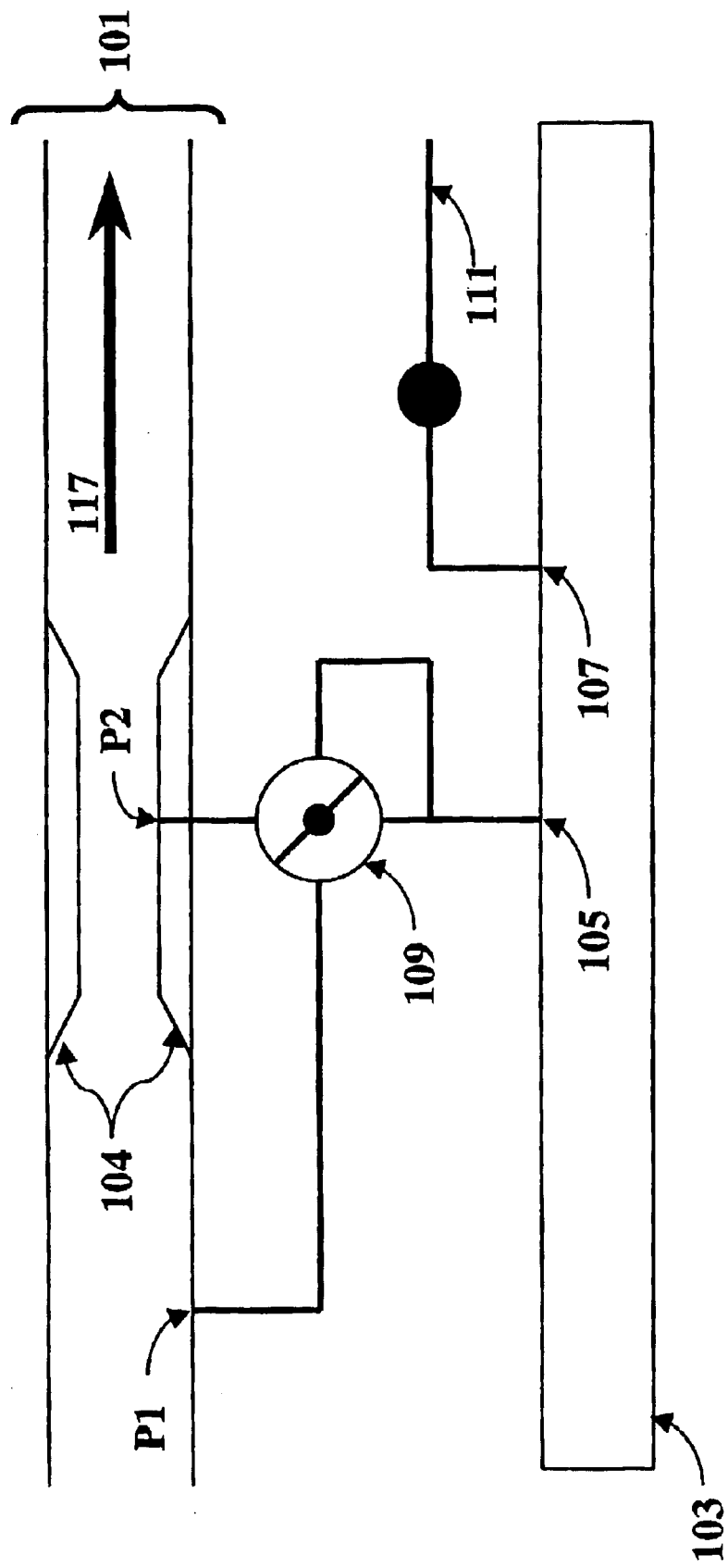
FIG. 1 is an illustration of a fluid-flow sourced acoustic cavity resonator.

While the invention will be described in connection with its preferred embodiments, it will be understood that the invention is not limited thereto. On the contrary, it is intended to cover all alternatives, modifications, and equivalents which may be included within the spirit and scope of the invention, as defined by the appended claims.

DETAILED DESCRIPTION OF THE PREFERRED EMBODIMENTS

The present invention is a method and system for creating and measuring a seismic wavefield for monitoring the distribution of the contents of a subsurface mineral deposit over its economic life span for long-term resource management. The system employs pressure waves generated within well bore structures. The wellbore structure is a resonant cavity outside of at least one wellbore tubular. The resonant cavity receives pressure energy from a device, or develops seismic waves from a resonant cavity design feature device in concert with fluid flow in the well. The pressure waves in the resonant cavity are converted to seismic body waves in the adjacent earth formation and radiate away from the well. These seismic body waves detected by sensors may be processed to indicate parameters of interest in the subsurface earth formation.

Time varying changes of selected attributes of those seismic waves that have transmitted the deposit between boreholes or between boreholes and seismic sensors, may be indicative of the temporal changes in the reservoir mineral content. Variations will be readily apparent to persons skilled in the art based on the following detailed description. To the extent that the following detailed description is specific to a particular embodiment or a particular use of the invention, this is intended to be illustrative and is not to be construed as limiting the scope of the invention.

As is well known in the art, wellbore production systems are comprised of tubulars. Wellbore systems generally include a well casing in the earth that separates the well apparatus and production equipment from the earth formation along the well path. Casing is not always present, for example at the bottom of some wells. Other tubulars may be inside the well casing and sometimes extending below the casing, including one or more production tubing strings. Other tubulars may transport fluids, chemicals and provide communication and energy conduits between the surface and downhole locations. The resonant cavity of the present invention is outside of at least one of the wellbore tubular structures.

This invention provides seismic sources in a well bore for the purpose of in-situ imaging. Prior art bore hole seismic sources are for transient use in the borehole and require intervention in, and disruption of, the production stream. The present invention is for a permanently installed seismic source mounted externally to the production tubing (a preferred embodiment), which uses little power compared to its radiated strength. A source of this type can be used to implement a field wide in-situ imaging array.

The term "signature" as used wherein, means the variations in amplitude, frequency and phase of an seismic waveform (for example, a Ricker wavelet) expressed in the time domain as displayed on a time scale recording. As used herein the term "coda" means the seismic body wave seismic-energy imparted to the adjacent earth formation at a particular location. The coda associated with a particular seismic energy source point, resonant cavity, or minor well bore obstruction will be the seismic signature for that seismic energy source point. The term "resonant cavity" includes any shape or character of a fluid filled chamber from which seismic energy emanates. The resonant cavity may contain more than one fluid. The term "minor borehole obstruction" or "borehole discontinuity" or "discontinuity" means an irregularity of any shape or character in the borehole such that tube wave energy transmitting the well borehole will impart some energy to the irregularity in the borehole and thus radiate body wave energy into the surrounding earth formation while continuing to also transmit and reflect some the tube wave energy along the borehole. The term "impulse response" means the response of the instrumentation (seismic sensors and signal processing equipment) to a spike-like Dirac function or impulse. The signal energy of an acoustic wavefield received by seismic sensors depends upon the texture of the rock layers through which the wavefield propagated, from which it was reflected or with which it is otherwise associated, whether along vertical or along lateral trajectories. The term "texture" includes petrophysical parameters such as rock type, composition, porosity, permeability, density, fluid content, fluid type and inter-granular cementation by way of example but not by way of limitation.

For the purpose of clarity and explanation, the method of this invention will be described by way of example, but not by way of limitation, with respect to cross-well tomography with receivers in boreholes as well as the earth surface. It is to be clearly understood that the method may be applied to any multichannel data recording geometry or acquisition regime whether seismic sensors are in the subsurface, in well bores, or at or near the surface of the earth.

Changes in the hydrocarbon reservoir over the production life of the reservoir may be detected by changes in a parameter of interest as indicated by temporal changes in seismic body wave characteristics or attributes. The parameter of interest may be any seismic attribute, individually or in combination, of detected seismic body waves which have traversed the reservoir. Seismic attributes are well known in the art. Some examples of attributes are seismic impedance, amplitude, attenuation, frequency, phase, polarity, velocity, dip, azimuth, envelope, etc.

Body waves radiating from each resonant cavity location will produce a unique source signature. Source signatures are related to the source behavior dynamics and the resonances created. These source signatures may be measured directly by a transducer near the resonant cavity, or measured by transducers at some distance away from resonant cavity. Additionally, the source signature of the body waves may be derived from known parameters for each well in combination with tube waves measured along the production string.

The source signature (or coda) associated with a particular resonant cavity will be the seismic signature for that seismic energy source point. However, as disclosed in U.S. Pat. No. 6,456,566 to Aronstam, minor well bore obstructions radiate body waves, (both P-waves and S-waves) from wellbores. The method and system of the '566 patent may be combined with the resonant cavity method and system of the present invention so that coda recorded by seismic sensors include signal contributions from resonant cavity radiation as well as minor borehole obstructions.

In a preferred embodiment a receiver is placed near a resonant cavity to record source signature associated with the resonant cavity. However, there are other methods of determining or measuring signatures, and receivers are not required to directly measure the source signature for every seismic source. A transducer may be lowered in the annular space and a pilot signal directly recorded. For example, a lightweight fiber optic transducer may be used to record data while having a negligent effect on transmitted seismic energy.

Alternatively, beam steering of recordings of receiver arrays (which can be on the earth's surface or any other location) may be used to determine the location and signature of seismic source resonators along the well bore. Beam steering is a method of emphasizing energy from a particular direction and location by delaying successive channels so that events of a certain dip moveout (or apparent velocity) occur at the same time, and then summing them. Beam steering involves time-shifting the results from single sources by amounts that are proportional to the distances between the sources and adding the results to direct the beam. The beam directivity may be changed by varying the time shifts. This procedure can be repeated for a succession of different seismic source locations.

Complex and arbitrary shapes for the resonant cavity may be designed to increase the variability of the source signature as well as to change the effective bandwidth and frequency characteristics of the radiated signal. The resonant cavity is in the annulus of the wellbore. In preferred embodiments, the cavity surrounds a wellbore tubular structure. The present invention provides the resonant cavity can be asymmetrical and arbitrary in shape. The resonant cavity can be designed for emanating a broad range of frequencies into the formation adjacent the well. The energy supply for the resonant cavity acoustic source can be the natural fluid flow and/or pressure changes in the production tubing.

The earth may be imaged using the method previously discussed once the signal is known, for example from the source signature. Although the source signature may be deduced, $t_0$ (the source initiation time) may be unknown for a parameter of interest under some acquisition conditions. For seismic attenuation imaging, knowing $t_0$ is unnecessary as one only needs the frequency envelope decay over time to create an image. If a time based reconstruction is sought, determination of the initial time reference may be accomplished using the cross correlation of pressure or acoustic energy measured at one wellhead or even using multiple wells. Another alternative would be, as previously explained, to permanently deploy one or more sensors in the well to determine the reference time, $t_0$.

Each resonant cavity can be an energy radiation source point with a unique waveform for acoustic energy radiated into the adjacent earth formation. A sensor is placed to record the waveform as it is generated. Each coda is then deconvolved, for example using cross correlation, with the seismic wave field recorded away from the well bore, for instance with seismic sensors in another well bore or on the surface of the earth or the ocean floor.

FIG. 1 schematically illustrates how a resonant cavity can be used in conjunction with a borehole production string 101. For illustration, the wellbore contains fluid flow 117 in an arbitrary direction. A resonant cavity 103 can be used to create and develop resonant energy. A resonant cavity 103 is a cavity in which standing waves can be built up. These standing waves have frequencies that depend upon the cavity volume, geometric shapes and dimensions, and the size of any apertures.

There are two variables that determine the primary frequency of any resonant cavity. The first variable is physical size. In general, the smaller the cavity, the higher its resonant frequency. The second controlling factor is the shape of the cavity. Any completely enclosed conductive surface, regardless of its shape, can act as a cavity resonator. In general, the resonant frequency of a cavity can be varied by changing any of three parameters: cavity volume, cavity capacitance, or cavity inductance. Changing the frequencies of a cavity is known as tuning.

which may be of any type and any type of borehole may contain implements, obstructions (for example 104) or other components that can act to convert energy of flowing fluids into pressure energy. For example, a gas lift or gas production system may be modified with openings in the production tubing P1 and P2 that are in pressure communication with resonant cavity 103 through a rotary valve 109 device. A fluid column, for example from naturally occurring subterranean formation fluids, can be in pressure contact with the resonant cavity through an aperture 105. Fluids and fluid pressure can leave the resonant cavity 103 through an exit aperture 107, which may be a fluid equalization port to maintain the average pressure in the resonant cavity, such that the pressure is maintained near the pressure in the vicinity of P1. The exit aperture 107 may lead to a gas line 111. The rotary valve 109 can be used for controlling or initiating frequencies the resonant cavity will receive from the fluid flow through the production tubing.

Alternatively as, shown in FIG. 2A for a production string 201 a resonant cavity 203 may receive pressure pulses through an alternate driving mechanism Electro-Solenoid 209 device. While the resonant cavities 103 of FIG. 1 and 203 of FIG. 2A are shown as rectangular, it is known that altering the geometrical shape of the resonant cavity will enable a more evenly broad frequency response over a wider range than a rectangular form would normally enable. FIG. 2B illustrates the production string 201 configuration of FIG. 2A with a resonant cavity 207 shaped to allow for radiation of a more evenly broad frequency resonance.

A resonant cavity is excited to resonance by injecting pressure pulses at a frequency to match the length, the width or match other geometric attributes of the cavity, and thereby creating resonances that radiate from the cavity into the earth formation surrounding the well. Various devices can be used to convert fluid flow energy to pressure energy in the resonant cavity. The rotary valve 109 of FIG. 1 converts the production fluid flow energy into pressure energy for the resonant chamber. The electric solenoid 209 of FIG. 2 converts electrical energy from the surface into pressure energy and directs the energy into the chamber. The rotary valve 109 or electric solenoid 209 activation speed is a function of the frequency the resonant chamber radiates into the earth formation. Alternatively, a pump could be implemented in conjunction with a rotary valve or solenoid, or implemented separately to inject fluid flow pressure energy into the resonant cavity. A resonant cavity 103, 203 or 207 can have an optional pressure port P3 that allows for pressure within the cavity to equalize. The seismic source pressure energy within the resonant cavity may be developed around some mean value, or the pressure fluctuations may appear to be added or subtracted from some constant or background pressure within the cavity.

As illustrated in FIG. 3A and FIG. 3B this concept is extended to a resonant cavity 303, which is concentric but external to the production tubing 301 in a producing well. Prior art (Winbow U.S. Pat. No. 5,268,537), shows that by altering the shape of the resonant cavity, one can support a broad range of frequencies without mechanically changing the cavity. This same principle can be applied in the resonance cavity 303 as shown in FIG. 3A and FIG. 3B. To prevent undue stress and radiation of energy back into the production string, FIG. 3B illustrates than an isolation zone or thick wall tubing 305 for a production string 301 can be employed in the area of the resonant cavity 303.

The outside surface 307 of the resonant cavity 303 has a relatively thinner wall (compared to the thick wall tubing or isolation zone 305) to allow seismic energy easier radiation into the subterranean earth formation. The cross-section view of the resonant cavity 303 is shown in FIG. 3B between the outside resonant cavity wall 307 and the inside isolation wall tubing 305. These resonant cavity sources are capable of producing both P and S wave energy. A pressure control mechanism 309, which may be referred to as an excitation means, which may be a valve, solenoid or pump, can be used for controlling or initiating fluid pressure energy into the resonant cavity 303.

Figure 4:
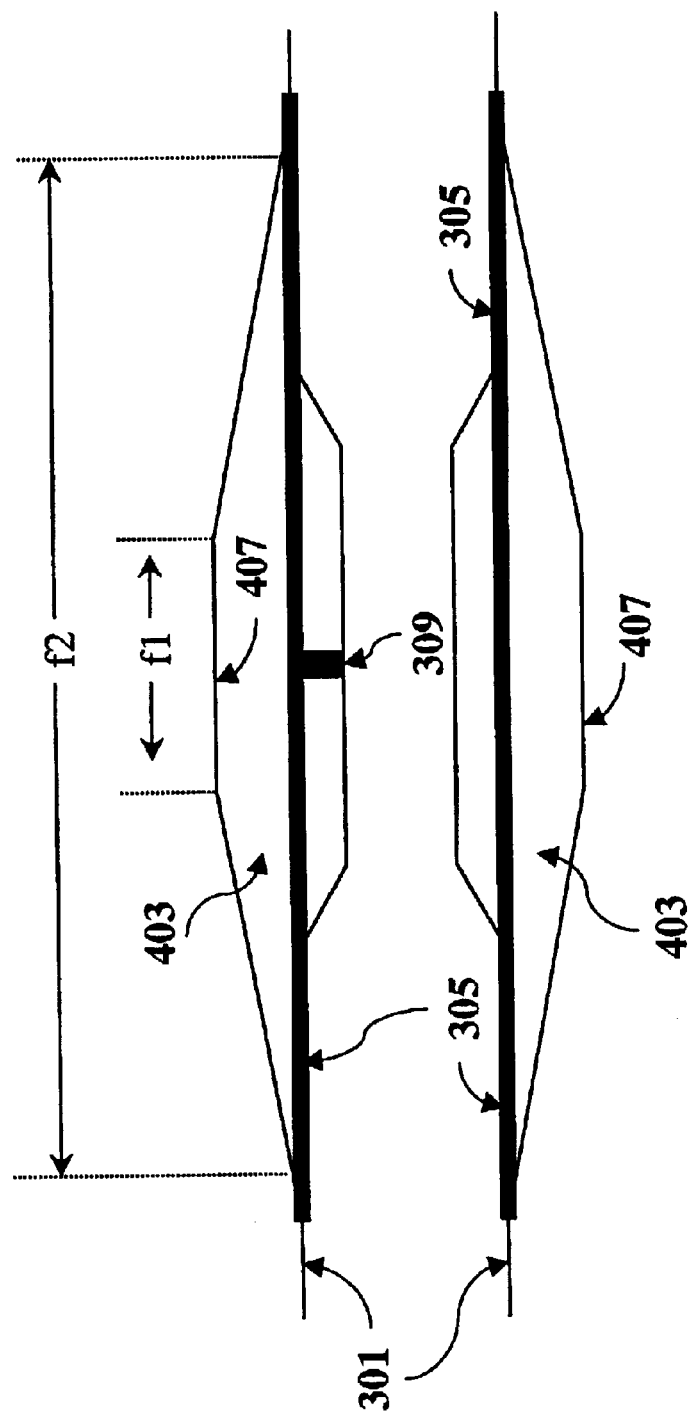
FIG. 4 illustrates a resonant cavity shaped for broad frequency resonance.

There are several variations for creating and driving these type external concentric cavities. For example, FIG. 4 illustrates a resonant cavity 403 that has one length f1 along the outside perimeter 407 section of resonant chamber 403 and another along length f2 along the inside length adjacent to the production string tubular. Between the midsection outside perimeter and the resonant cavity is shown linearly tapered to the inside of the cavity, but other geometries may be desired. Resonant cavities substantially similar to 403 can be designed and operated to create the strongest resonant frequencies between a relatively high frequency determined by the length f1, and the relatively lower frequency determined by the length f2. The speed of a rotary valve, pump or solenoid can be varied to target these relative frequency ranges to maximize the resonant energy radiating from the resonant cavity. Another example is illustrated in FIG. 2B where resonant cavity 207 is shaped to allow a broad frequency resonance response.

Figure 5:
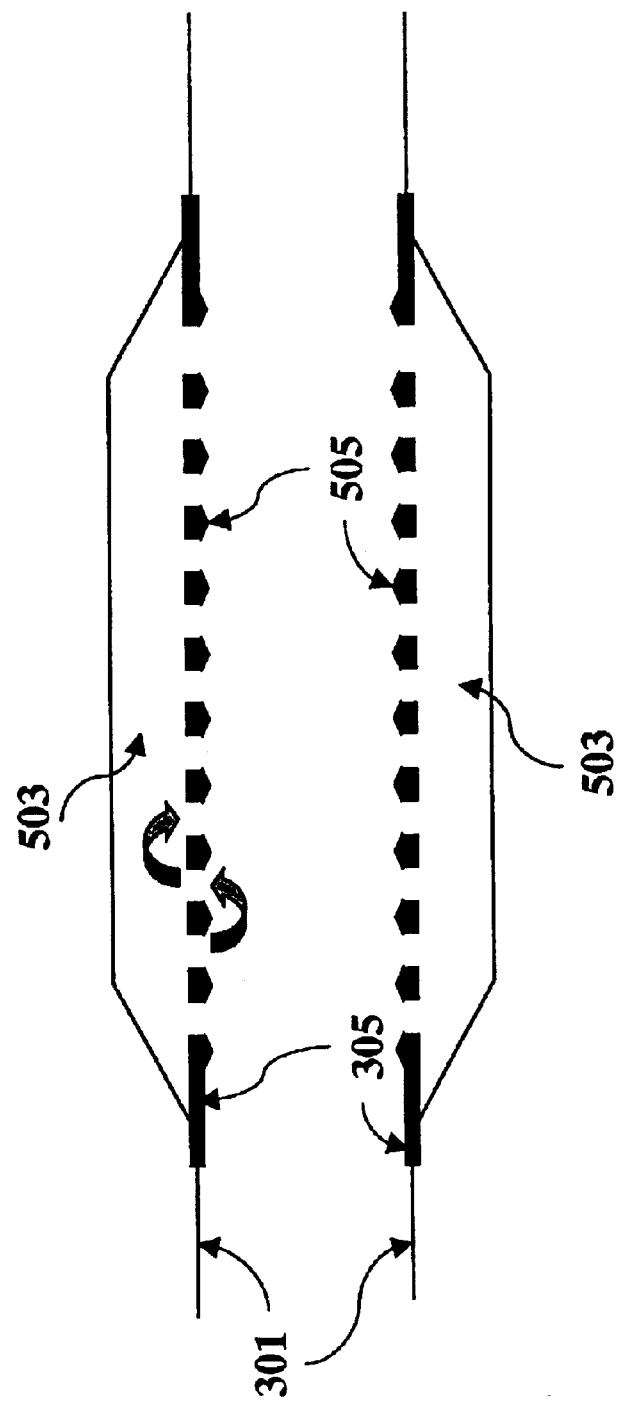
FIG. 5 illustrates a production flow driven resonant source.

As shown in FIG. 5, one can drive the resonate chamber using a series of ports and baffles 505 adjacent to and with wellbore production fluid flow if there is sufficient energy in the production flow stream such that the flow stream energy interacts with the baffling. By varying the fluid flow stream through the production tubing and/or the resonant cavity, a range of frequencies can be generated. Another embodiment provides for fully isolating the resonant system for the wellbore fluid and driving the system using components of a gas lift system (as in FIG. 1). This can provide a high frequency source, which would be appropriate in some installations.

Figure 6B:
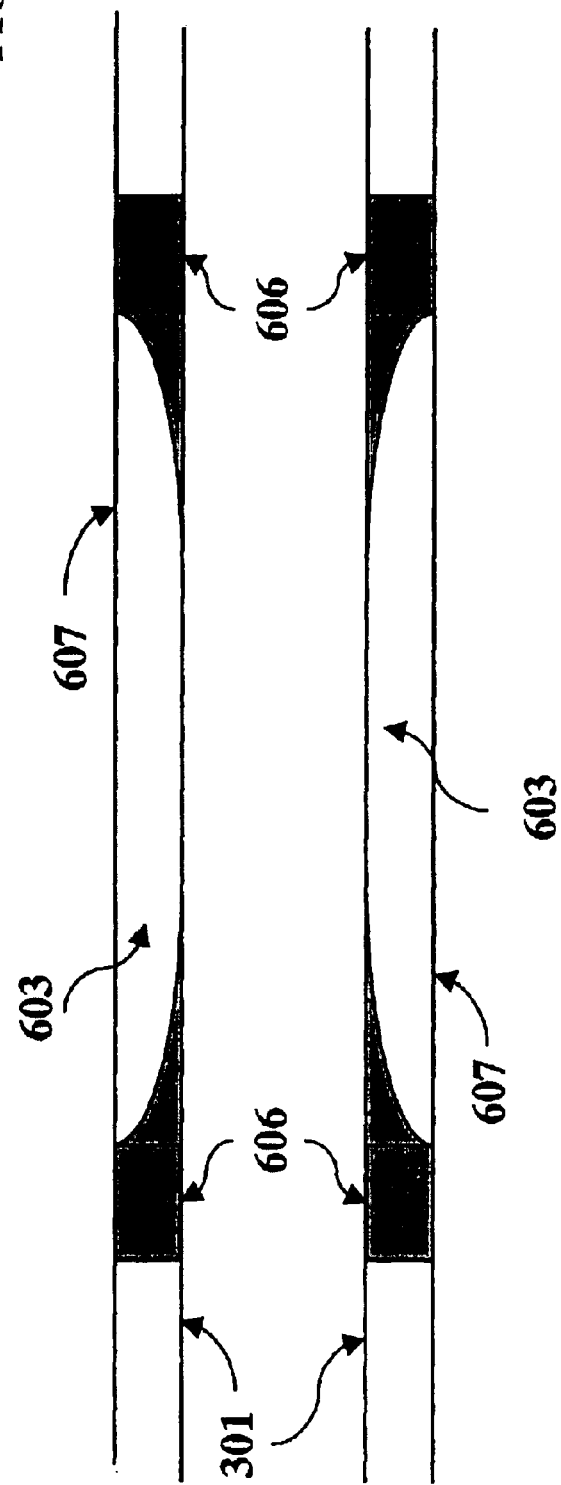
FIG. 6B illustrates a resonant cavity formed by dual packers that specialty-shaped.

As illustrated in FIG. 6A, an exterior cavity 603 can be created by proper spacing of packers 605 between the inside wellbore tubing 301 and the outside wellbore casing 607, normally used to isolate production zones from the annular space in the well. Here, packers 605 are adjacent to the cavity and provide separation from the rest of the tubular wellbore apparatus. Packers may be used to alter or otherwise enhance the signal characteristics of the resonant cavity 603 as illustrated in FIG. 6B. Special packers with designated or arbitrary shapes herein called "specialty-shaped" packers 606 may be used to form shaped resonance cavities to provide, for example, full or half standing wave capability for the resonant enclosure. Other specialty-shaped packers adjacent to the resonant cavity can be implemented to enable specific target ranges of frequencies or implemented for broad frequency seismic body wave radiation from the cavity. FIG. 6C illustrates a combination of a conventional packer 605 with a specialty-shaped packer 606 that can enable of half standing wave type response from resonant chamber 603.

Figure 6D:
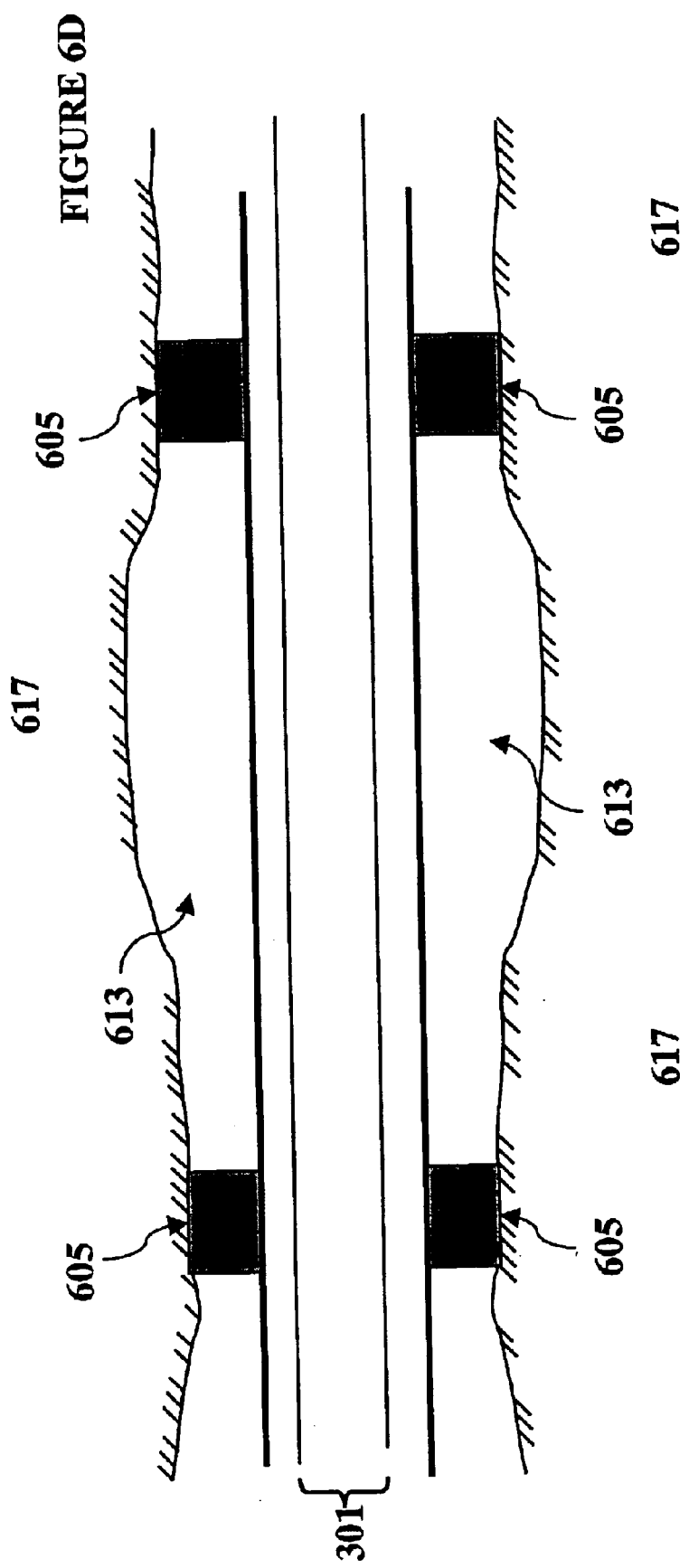
FIG. 6D illustrates a resonant cavity formed where the packers are external to the casing and the formation

A resonant cavity can be implemented between an outside wellbore tubular and a borehole formation when the annulus (the gap between the casing and the rock formation) is sealed with packers adjacent to the cavity ends. As illustrated in FIG. 6D the production tubing 301 does not need to be part of the resonant cavity when the resonant chamber 613 includes the space between the well casing 607 and the well formation 617. The resonant chamber 613 can be outside of the wellbore casing 607 where the packers 605 are external to the casing and the formation 617 is part of the resonant chamber. FIG. 6E illustrates a resonant chamber outside of well casing using specialty packers 606 for chamber shape modification. These types of resonant cavities are driven either by active or passive means (not shown).

The invention may be used with a reverse VSP type project as shown schematically in FIG. 7. A well 761 has resonant cavities (or chambers) 701, 703 and 705 from which body waves may radiate into the surrounding earth formation. As shown by lines originating at resonant cavity 703, body wave energy may travel directly to earth surface 740 where sensors 711 receive the energy. Body wave energy originating at, for instance, resonator 703 may reflect or refract off of geologic interfaces 750 in the earth. While one geologic interface has been shown, it will be appreciated the earth contains a great number of geological surfaces responsive to seismic energy. Body wave energy may emanate from any of the resonators, 701, 703 or 705, which also may have associated sensors to directly measure the associated source signature, waveform or seismic energy received from any other source point. Methods are known in the art for separating signals from these various sources.

Figure 8:
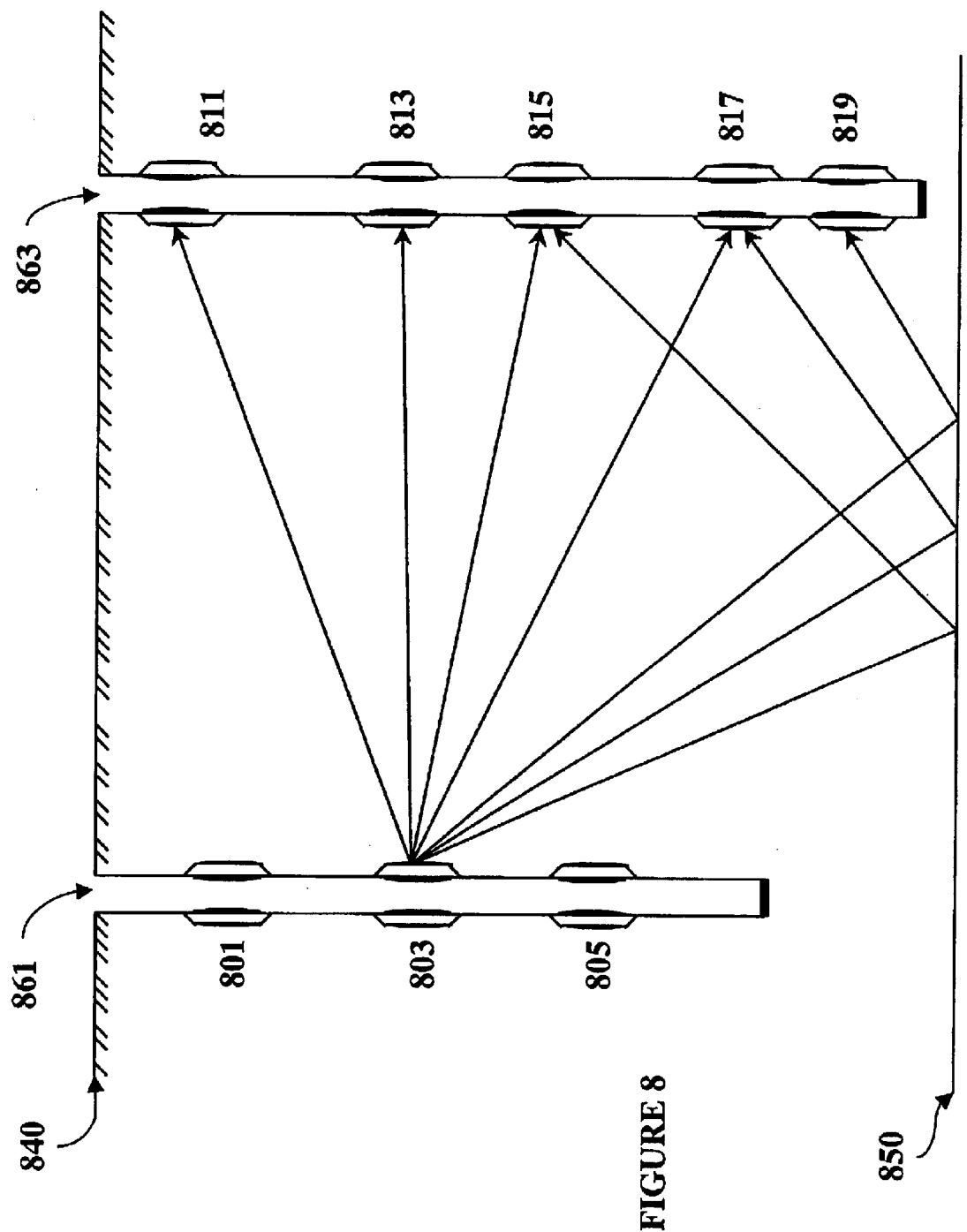
FIG. 8 is a schematic of a Cross-Well application type project utilizing the invention.

Cross-well type projects may be undertaken with this invention as shown in FIG. 8. A source well 861 can contain resonant sources 801, 803, 805 and 807. A cross-well project will have at least one receiver well 863 containing receivers 811, 813, 815, 817, 819 and 820. The lines originating at resonant chamber 803 show a few possible wave paths. The body wave energy may travel directly to receivers 811, 813, 815 and 817 in another well 863. The body wave energy may reflect or refract off of geologic interfaces 850 in the subsurface before being received by receivers 815, 817 and 819. As is well understood in the art, many other body wave paths traversing intervening earth formations containing useful information will be received at sensors in a cross-well type project.

Figure 9:
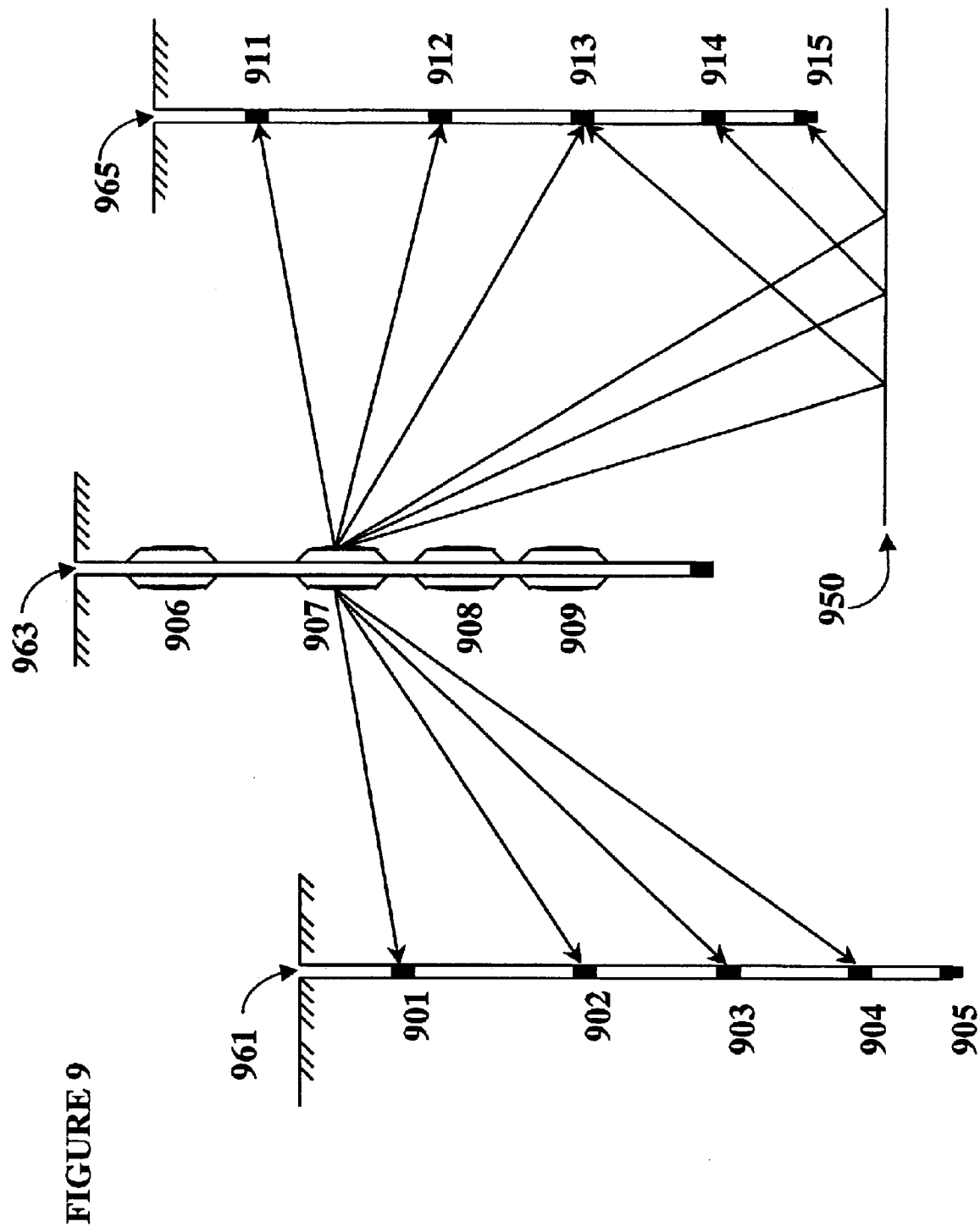
FIG. 9 is a schematic of a Multi-Well Cross-Well application type project utilizing the invention.

The cross-well project may be a multi-well project so that many boreholes (a plurality of wellbores) may be utilized to simultaneously record body wave energy emanating from a source well 963 as shown in FIG. 9. The source well 963 will have source points 906, 907, 908 and 909 for example, which may be resonant cavity sources. Receiver wells 961, 965 will contain receivers along the well bores 901 through 905, and 911 through 915 respectively. As in the FIG. 8 example, some or each of the receivers may be associated with resonant cavities in the receiver wells, since the receiver wells may also be utilized as source wells. Example body wave raypaths are shown originating at source point 907. The raypaths may be direct as shown between the source well 963 and receiver well 961. The raypaths may be combinations of reflected energy off of a geologic interface 950 with direct raypaths as shown by energy emanating at source well 963 and being received by receiver well 965.

After the receivers or acoustic sensors have received the signals, signal-processing methods well known in the art may be applied to the data. These methods may use processors such as computers and algorithms known in the art, for example cross-well methods.

As the foregoing examples demonstrate, this method may be used for hydrocarbon or other mineral deposit assessment at any point in time, over several time periods, and may be utilized as an ongoing part of the management and monitoring of a producing reservoir. Time varying changes of selected attributes of acoustic waves that have transmitted the earth formation between boreholes are indicative of the temporal changes in the mineral content. This invention allows for constant or periodic assessment of production and resource management during the productive life of oil, gas or other mineral deposits. Hydrocarbon migration during production, hydrocarbon migration during operations such as secondary recovery, steam flood progression, water invasion into oil and gas reservoirs are all examples of reservoir processes that may be monitored over time with this invention. Analysis methods include tomographic reconstruction and mapping a position of a fluid interface within the formation.

Persons skilled in the art will understand that the system and methods for generating and measuring seismic energy, and monitoring subsurface mineral deposits as described herein a examples that are not limited to the particular embodiments disclosed. Further, it should be understood that the invention is not to be unduly limited to the foregoing which has been set forth for illustrative purposes. Various modifications and alternatives will be apparent to those skilled in the art without departing from the true scope of the invention, as defined in the following claims.

What is claimed is:

1. A wellbore system for producing seismic energy in an earth formation comprising:
   (a) a cavity containing a fluid, said cavity disposed between a wellbore tubular and a wellbore formation;
   (b) a device for generating pressure waves in said cavity, said pressure waves generating seismic wave in said earth formation; and
   (c) wherein said pressure waves generating seismic waves in said earth formation are created at resonance frequencies of said cavity.

2. The wellbore system of claim 1 wherein the fluid in said cavity is at least one of: i) a liquid, and ii) a gas.

3. The wellbore system of claim 1 wherein said device converts energy to said pressure waves using at least one of: i) wellbore flow energy and ii) electric energy.

4. The wellbore system of claim 1 wherein said device includes at least one of i) a rotary valve, ii) an electro-solenoid oscillator, iii) a pump and iv) a baffle system adjacent to fluid flow.

5. The wellbore system of claim 1 wherein resonant frequencies of said cavity are determined from the geometry of said cavity.

6. The wellbore system of claim 1 wherein resonant frequencies of said cavity are determined from frequencies of said device for generating pressure waves.

7. A wellbore system for producing seismic energy in an earth formation comprising:
   (a) a cavity containing a fluid, said cavity disposed between a wellbore tubular and a wellbore formation;
   (b) a device for generating pressure waves in said cavity, said pressure waves generating seismic waves in said earth formation; and
   (c) wherein said device for generating pressure waves is activated in a range of predetermined frequencies to create a swept frequency signal input that is at least one of: i) an upsweep, ii) a downsweep, iii) a nonlinear sweep, a pseudo-random sweep and iii) a random sweep.

8. The wellbore system of claim 1 further comprising seismic sensors to record said generated seismic waves.

9. The wellbore system of claim 1 further comprising a seismic sensor adjacent to said cavity.

10. The wellbore system of claim 1 further comprising seismic sensor in a plurality of wellbores.

11. The wellbore system of claim 1 wherein said cavity is shaped to provide a broad frequency signal for said seismic waves in said earth.

12. The wellbore system of claim 1 wherein said seismic waves in said earth formation are at least one of: i) P-waves, and ii) S-waves.

13. The wellbore system of claim 1 wherein resonant frequencies of said pressure waves generating said cavity are related to a shape of said cavity.

14. The wellbore system of claim 1 a further comprising specialty-shaped packers adjacent to said cavity.

15. The wellbore system of claim 1 wherein said cavity is outside of wellbore casing.

16. The wellbore system of claim 1 wherein said cavity is outside of wellbore production tubing.

17. The wellbore system of claim 1 wherein said cavity is between wellbore production tubing and wellbore casing.

18. The wellbore system of claim 1 further comprising a pressure equalization port.

19. A method for generating seismic waves in an earth formation, the method comprising:
   (a) using a cavity containing fluid, said cavity disposed between a wellbore tubular and a wellbore formation;
   (b) generation pressure waves in said cavity with a device, said pressure waves generating said seismic waves in said earth formation; and
   (c) wherein said device converts wellbore fluid flow energy to said pressure waves.

20. The method of claim 19 wherein the fluid in said cavity is at least one of: i) a liquid, and ii) a gas.

21. A method for generating seismic waves in an earth formation, the method comprising:
   (a) using a cavity containing fluid, said cavity disposed between a wellbore tubular and a wellbore formation;
   (b) and generating pressure waves in said cavity with a device, said pressure waves generating said seismic waves in said earth formation; and
   (c) wherein said device converts electric energy to said pressure waves.

22. The method of claim 19 wherein said device includes at least one of i) a rotary valve, ii) an electro-solenoid oscillator, iii) a pump and iv) a baffle system adjacent to fluid flow.

23. The method of claim 19 wherein wellbore fluids flow through said cavity.

24. The method of claim 19 further comprising seismic sensors to record said generated seismic waves.

25. The method of claim 19 further comprising a seismic sensor adjacent to said cavity.

26. The method of claim 21 wherein resonant frequencies of said cavity are determined from frequencies of said device for generating pressure waves.

27. The method of claim 21 wherein said device for generating pressure waves is activate in a range of predetermined frequencies to create a swept frequency signal input.

28. The method of claim 19 wherein said cavity is shaped to provide a broad frequency signal for said seismic waves in said earth formation.

29. The method of claim 19 wherein resonant frequencies of said pressure waves are related to a shape of said cavity.

30. The method of claim 19 further comprising specialty-shaped packers adjacent to said cavity.

31. The method of claim 19 wherein said seismic waves in said earth formation are at least one of: i) P-waves, and ii) S-waves.

32. The method of claim 19 wherein said cavity is outside of wellbore casing.

33. The method of claim 19 wherein said cavity is outside of wellbore production tubing.

34. The method of claim 19 wherein said cavity is between wellbore production tubing and wellbore casing.

35. The method of claim 19 further comprising acquiring seismic data by recording said seismic waves in said earth formation with a seismic sensor at least one location at or near a surface location.

36. The method of claim 19 further comprising acquiring seismic data by recording said seismic waves in said earth formation with a seismic at least one location in a second wellbore.

37. The method of claim 19 further comprising recording said seismic waves in said earth formation with a plurality of seismic sensors; said recorded seismic waves responsive to a parameter of interest; and processing the recorded seismic waves to obtain information about the earth formation.

38. The method of claim 19 further comprising determining coda from recorded seismic waves and deconvolving said recorded data with said.

39. A method of monitoring a hydrocarbon reservoir within an earth formation the method comprising:
   (a) generating pressure waves in a cavity with a device for generating pressure waves between a wellbore tubular and the earth formation, said pressure waves generating said seismic waves in said earth formation, said seismic waves traversing said earth formation;
   (b) detecting signals indicative of a parameter of interest of said hydrocarbon reservoir, using a plurality of seismic detectors to record seismic body waves radiated from a cavity containing fluid, said cavity in a space between a wellbore tubular and a wellbore formation;
   (c) repeating steps (a) and (b) at a later time to provide signals indicative of a parameter of interest of said hydrocarbon reservoir at said at later time; and
   (d) deter a change in said hydrocarbon reservoir by comparing signals indicative of a parameter of interest of said hydrocarbon reservoir with the parameter of interest of said hydrocarbon reservoir at said later time.

40. The wellbore system of claim 7 further comprising seismic sensors to record said generated seismic waves.

41. The wellbore system of claim 7 further comprising a seismic sensor adjacent to said cavity.

42. The wellbore system of claim 7 further comprising seismic sensors in a plurality of wellbores.

43. The wellbore system of claim 7 wherein said cavity is shaped to provide a broad frequency signal for said seismic waves in said earth formation.

44. The wellbore system of claim 7 wherein said seismic waves in said earth formation are at least one of: i) P-waves, and ii) S-waves.

45. The wellbore system of claim 7 further comprising specialty-shaped packers adjacent to said cavity.

46. The wellbore system of claim 7 wherein said cavity is outside of wellbore casing.

47. The wellbore system of claim 7 wherein said cavity is outside of wellbore production tubing.

48. Tho wellbore system of claim 7 wherein said cavity is between wellbore production tubing and wellbore casing.

49. The wellbore system of claim 7 further comprising a pressure equalization port.

50. The method of claim 21 wherein the fluid in said cavity is at least one of:
   i) a liquid, and ii) a gas.

51. The method of claim 21 wherein said device includes at least one of i) a rotary valve, ii) an electro-solenoid oscillator, iii) a pump and iv) a baffle system adjacent to fluid flow.

52. The method of claim 21 wherein wellbore fluids flow through said cavity.

53. The method of claim 21 further comprising seismic sensors to record said generated seismic waves.

54. The method of claim 21 comprising a seismic sensor adjacent to said cavity.

55. The method of claim 21 wherein said cavity is shaped to provide a broad frequency signal for said seismic waves in said earth formation.

56. The method of claim 21 wherein resonant frequencies of said pressure waves are related to a shape of said cavity.

57. The method of claim 21 further comprising specialty-shaped packers adjacent to said cavity.

58. The method of claim 21 said seismic waves in said earth formation arc at least one of: i) P-waves, and ii) S-waves.

59. The method of claim 21 wherein said cavity is outside of wellbore casing.

60. The method of claim 21 wherein sad cavity is outside of wellbore production tubing.

61. The method of claim 21 wherein said cavity is between wellbore production tubing and wellbore casing.

62. The method of claim 21 further comprising acquiring seismic data by recording said seismic waves in said formation with a seismic sensor at let one location at or near a surface location.

63. The method of claim 21 further comprising acquiring seismic data by recording said seismic waves in said earth formation with a seismic sensor at least one location in a second wellbore.

64. The method of claim 21 further comprising recording said seismic waves in said earth formation with a plurality of seismic sensors; said recorded seismic waves responsive to a parameter of interest; and processing the recorded seismic waves to obtain information about the earth formation.

65. The method of claim 21 further comprising determining coda from recorded seismic waves and deconvolving said recorded data with said coda.

* * * * *